(12) United States Patent
Mao

(10) Patent No.: US 10,619,660 B2
(45) Date of Patent: Apr. 14, 2020

(54) CLASP

(71) Applicant: Xuefen Mao, Zhejiang (CN)

(72) Inventor: Xuefen Mao, Zhejiang (CN)

(*) Notice: Subject to any disclaimer, the term of this patent is extended or adjusted under 35 U.S.C. 154(b) by 0 days.

(21) Appl. No.: 15/894,952

(22) Filed: Feb. 13, 2018

(65) Prior Publication Data
US 2019/0249699 A1    Aug. 15, 2019

(51) Int. Cl.
*F16B 2/24* (2006.01)

(52) U.S. Cl.
CPC .................... *F16B 2/248* (2013.01)

(58) Field of Classification Search
CPC ....... F16B 2/248; F24C 15/021; Y10T 24/308
See application file for complete search history.

(56) References Cited

U.S. PATENT DOCUMENTS

| | | | | |
|---|---|---|---|---|
| 1,896,590 A * | 2/1933 | Place | ................... | A47C 21/026 24/296 |
| 2,020,206 A * | 11/1935 | Place | .................. | B60R 13/0206 24/296 |
| 2,043,007 A * | 6/1936 | Place | .................. | B60R 13/0206 24/296 |
| 2,163,455 A * | 6/1939 | Van Uum | ................ | F16B 5/125 24/289 |
| 2,215,428 A * | 9/1940 | Place | ....................... | A44B 3/02 24/296 |
| 2,220,273 A * | 11/1940 | Place | ..................... | F16B 5/125 24/626 |
| 5,205,075 A * | 4/1993 | Moyer | .................... | F16B 2/243 49/492.1 |
| 5,806,149 A * | 9/1998 | Schultz | ................... | F16B 2/248 24/291 |
| 6,533,289 B2 * | 3/2003 | Bono, Jr. | .............. | F16J 15/061 277/628 |
| 7,124,540 B2 * | 10/2006 | Qiang | ................... | F24C 15/021 49/492.1 |
| 7,464,461 B2 * | 12/2008 | Hight, Jr. | ............... | B21D 53/36 24/293 |
| 8,214,974 B2 * | 7/2012 | Zhou | ..................... | F24C 15/021 24/296 |
| 8,601,646 B2 * | 12/2013 | Wang | ..................... | F16B 2/248 24/296 |
| 9,447,628 B2 * | 9/2016 | Qiang | ................... | F16J 15/027 |
| 10,240,798 B2 * | 3/2019 | Mi | ........................ | F25D 23/087 |
| 2013/0097937 A1 * | 4/2013 | Flasher | ................... | D06F 58/04 49/492.1 |

* cited by examiner

*Primary Examiner* — Robert Sandy
*Assistant Examiner* — Louis A Mercado
(74) *Attorney, Agent, or Firm* — W&K IP

(57) ABSTRACT

A clasp for connecting sealing parts of a heating vessel and a main body of a heating container, having a clasp body and an "8" shaped base. The clasp body has a diamond shape and is made to be elastic so that the clasp can firmly connect with the heating vessel. The "8" shape of the base is non-closed and is a non-planar structure.

4 Claims, 1 Drawing Sheet

CLASP

BACKGROUND OF THE INVENTION

The present invention belongs to the technical field of hardware and in particular, relates to a clasp.

At present, because the base of the connecting clasp is round or oval, and the inner sleeve of the seal has no intersection point with the outer wire mesh skeleton, so the outer wire mesh skeleton is easy to shift.

BRIEF SUMMARY OF THE INVENTION

In order to overcome the defects existing in the prior art, the present invention aims to provide a clasp which can avoid the shift of the wire mesh skeleton and is elastic, and can secure the seal firmly on the body of the heating vessel.

The technical solution provided by the invention is:

The clasp including the clasp body and the base, wherein the clasp body is a diamond-shaped, and the base is an "8" shape.

Preferably, the clasp is made of stainless steel material.

Preferably, the "8" shape of the base is non-closed and the "8" shape is a non-planar structure.

Preferably, the "8" shape of the base is a "8" shape spirally upward from the bottom.

Preferably, the clasp body is a non-closed rhombus and is a non-planar rhombus.

Preferably, the clasp body and the base are formed as a whole.

Preferably, the clasp body is made of elastic stainless steel, and deformation can occur when the external force is applied. After eliminating the external force, the clasp body can bounce back to the original shape.

Preferably, the base is a 6-shape or 9-shape.

The beneficial effect of the invention is:

After using the clasp of the invention, the shift between the inner casing of the seal and the outer wire mesh skeleton can be avoided. After the diamond-shaped rebound of the clasp body, the end of the clasp body can be clamped in the heating vessel body, so that the seal can be better connected with the heating vessel body.

1: The clasp body; 2: The base.

DETAILED DESCRIPTION OF THE INVENTION

The present invention will be further illustrated below in combination with drawings of the description.

Figure 1:
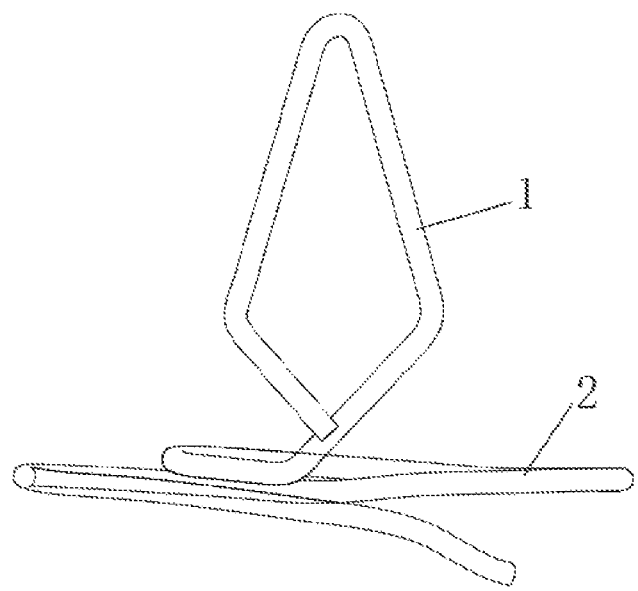
FIG. 1 is a structural schematic diagram of the present invention.
Figure 2:
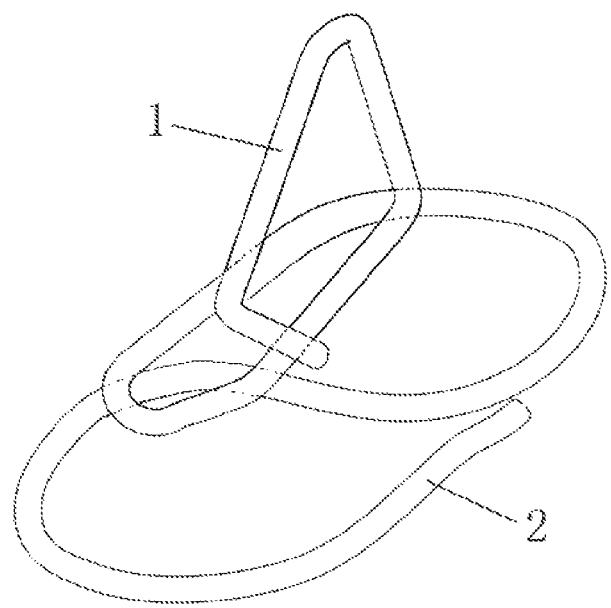
FIG. 2 is a structural schematic diagram of the present invention.

As shown in FIGS. 1 and 2, the clasp includes the clasp body and the base, the clasp body is diamond-shaped. and the base is an "8" shape. The "8" shape of the base is non-closed and the figure 8 is in a non-identical plane, the "8" shape of the base is a "8" shape spirally upward from the bottom. the diamond shape of the clasp is non-closed and clasp is stretchy. Deformation can occur when the external force is applied. After eliminating the external force, the clasp body can bounce back to the original shape.

At the same time, the clasp body and the base are formed as a whole.

When in use, compress the clasp and the clasp body is inserted into the heating vessel, when release the pressure, the clasp automatically bounces back into its original state and is inserted into the heating vessel.

What is claimed is:

1. A clasp, comprising a clasp body and a base, wherein the clasp body is diamond shaped, and the base is an "8" shape; wherein the "8" shape of the base is non-closed and the "8" shape is a non-planar structure; wherein the clasp is made of a single wire comprising two ends; wherein one end of the wire terminates at the base, and the other end terminates on the clasp body; and wherein the clasp body deforms when the clasp body is subject to an external force, and resumes an original shape when the external force is removed.

2. The clasp according to claim 1, wherein the clasp is made of stainless steel material.

3. The clasp according to claim 1, wherein the "8" shape of the base is the "8" shape spirally upward from a bottom.

4. The clasp according to claim 1, wherein the clasp body is made of elastic stainless steel.

* * * * *